United States Patent [19]
Oshitari

[11] Patent Number: 4,728,349
[45] Date of Patent: Mar. 1, 1988

[54] AIR FILTER MEDIUM

[76] Inventor: Yoshimi Oshitari, 1-10-8, Honcho, Tanashi-shi, Tokyo-To, Japan

[21] Appl. No.: 715,113

[22] Filed: Mar. 22, 1985

Related U.S. Application Data

[63] Continuation of Ser. No. 449,208, Dec. 13, 1982, abandoned, which is a continuation of Ser. No. 282,245, Jul. 13, 1981, abandoned.

[30] Foreign Application Priority Data

Aug. 14, 1980 [JP] Japan .................. 55-110996

[51] Int. Cl.$^4$ ............................................. B01D 39/14
[52] U.S. Cl. .......................................... 55/487; 55/528; 55/DIG. 5
[58] Field of Search .................... 55/486–488, 55/528, DIG. 5

[56] References Cited

U.S. PATENT DOCUMENTS

| | | | |
|---|---|---|---|
| 3,208,205 | 9/1965 | Harms et al. | 55/487 X |
| 3,258,900 | 7/1966 | Harms | 55/487 X |
| 3,262,578 | 7/1966 | Dennis | 55/487 X |
| 3,490,211 | 1/1970 | Cartier | 55/487 |
| 3,505,794 | 4/1970 | Nutter et al. | 55/487 |
| 3,986,851 | 10/1976 | Grodek | 55/DIG. 5 X |
| 4,011,067 | 3/1977 | Carey, Jr. | 55/487 X |
| 4,102,785 | 7/1978 | Head et al. | 55/487 X |
| 4,188,197 | 2/1980 | Amberkar et al. | 55/487 X |

FOREIGN PATENT DOCUMENTS

| | | | |
|---|---|---|---|
| 2718581 | 11/1977 | Fed. Rep. of Germany | 55/486 |
| 1018503 | 1/1966 | United Kingdom | 55/488 |

Primary Examiner—Kathleen J. Prunner
Attorney, Agent, or Firm—Robert E. Burns; Emmanuel J. Lobato

[57] ABSTRACT

An air filter medium, in which a dust-collecting layer of glass fibers of a diameter necessary for obtaining a desired dust-collecting efficiency is formed on a supporting fiber layer of low dust-collecting efficiency and low pressure drop to a sufficient thickness to obtain a desired dust-collecting efficiency and a desired pressure drop of the air filter medium.

3 Claims, 2 Drawing Figures

AIR FILTER MEDIUM

BACKGROUND OF THE INVENTION

This is a continuation of application Ser. No. 449,208 filed Dec. 13, 1982, which is a continuation Rule 62 of Ser. No. 282,245 filed July 13, 1981, both abandoned.

The present invention relates to an air filter medium which can collect dust with a high efficiency and has various advantages, such as low pressure drop and capability of substantial reduction of its bulk upon disposal by incineration thereof.

With recent advanced technology, large scale integration (LSI) units, for instance, have been brought to realization. On the other hand, however, the presence of dust in the atmosphere of each manufacturing operation poses a serious problem and, even with a filter medium which is regarded as of the highest-efficiency it is almost impossible to avoid the influence of dust, for example, during the manufacturing process of a semiconductor. Further, in the atomic power industry, for instance in an atomic power plant, it is necessary, from the viewpoint of environmental protection, to inhibit discharge of radioactive dust to the outside atmosphere, so that this also requires a highly efficient filter medium. In addition, since the amount of radioactive waste must be reduced, it is strongly desired that the bulk of a used filter medium should be decreased by incineration upon disposal thereof; accordingly, it is of urgent necessity to develop a filter medium capable of meeting such requirements. A high-efficiency filter medium that has widely been used in the past is produced by rendering glass fibers into a paper-like form, and the smaller the diameter of the fiber used is, the higher the dust collecting efficiency of the filter medium. The present inventor made a filter medium of glass fibers, with the glass fibers made markedly small in diameter as compared with synthetic and natural fibers commonly used in conventional filters. The filter medium made by the inventor has a dust collecting efficiency higher than those known and fully satisfies the aforementioned requirements in the semiconductor and other industries. For example, the filter medium made has a dust collecting efficiency as high as 99.9999% or more in the case of $0.12\mu$ diameter particles. It is evident, however, that a filter medium cannot be said to be practical simply because it has a high dust collecting efficiency; its air resistance or pressure drop must be minimized in addition to its having a high dust collecting efficiency. In general, however, in producing a high-efficiency filter medium using small-diameter fibers, even if they are of the same thickness, the pressure drop markedly increases as the dust collecting efficiency is raised. Accordingly, a practical filter medium cannot be obtained only by the use of small-diameter glass fibers.

SUMMARY OF THE INVENTION

An object of the present invention is to provide an air filter medium which meets with the aforesaid requirements, such as a high dust-collecting efficiency, a low pressure drop, inexpensiveness and a capability of having its bulk reduced by incineration.

In accordance with the present invention, there is provided an air filter medium, in which a dust-collecting layer of glass fibers, of a diameter necessary for obtaining a desired dust collecting efficiency, is formed on a supporting fiber layer of low dust-collecting efficiency and low pressure drop at a sufficient thickness to obtain the desired dust-collecting efficiency and the desired pressure drop of the air filter medium.

BRIEF DESCRIPTION OF THE DRAWINGS

The present invention will hereinafter be described in comparison with the prior art with reference to the accompanying drawings, in which.

DETAILED DESCRIPTION

To illustrate differences between the prior art and the present invention, the prior art will first be described.

Figure 1:
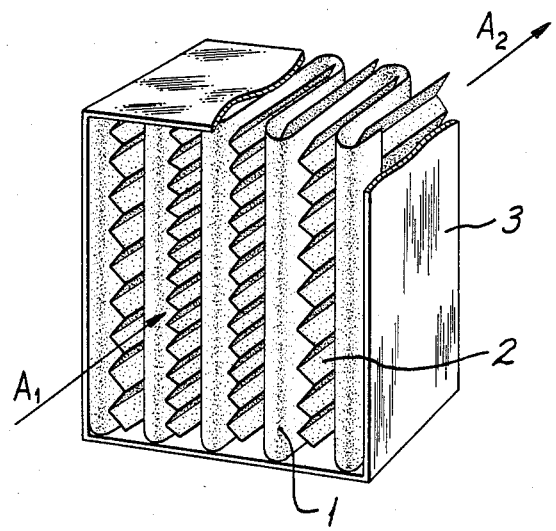
FIG. 1 is a perspective view of an example of conventional air filters.

Noting that the air pressure drop of a filter medium is decreased by the reduction of its thickness and that the reduced thickness has substantially no affect on the dust collecting efficiency, the present inventor has tried to reduce the thickness of the filter medium using the abovesaid small-diameter glass fibers. However, the glass fibers are much inferior to synthetic fibers of natural fibers in mechanical strength, and the mechanical strength thereof naturally decreases with a decrease in the diameter. Accordingly, the thinner the filter medium using the small-diameter fibers is, the lower its mechanical strength is. In an air filter which has widely been used, such as shown in a perspective view of FIG. 1, in which a filter medium 1 is folded in a wave configuration of regular intervals so as to hold corrugated separators 2 between adjacent segments of the folded filter medium 1 and hermetically sealed to a frame 3 to make the air passage area large as compared with the air inflow area of the frame 3 for increasing the dust retaining capacity thereof; the filter medium is often deformed and broken by the blast pressure. To avoid this, the filter medium is inevitably made thick, and consequently the pressure drop becomes extremely high. For example, an air flow in the direction of an arrow $A_1$ in FIG. 1 with the length of the arrow representing pressure, the pressure drop is illustrated by an arrow $A_2$ and the shortened arrow denotes an air pressure drop. With this method, a high dust collecting efficiency can be achieved but the filter medium is not practical in terms of the pressure drop. At present, there is commonly used in foreign countries and Japan a method of obtaining a desired pressure drop of a filter medium while maintaining its mechanical strength by paper-making concepts with the mixture of several kinds of glass fibers or other fibers with the small-diameter glass fibers. This method is intended to maintain the mechanical strength and, at the same time, to obtain a high dust collecting efficiency. The dust collecting efficiency achieved by this method is about 99.97% with respect to $0.3\mu$ diameter particles when the pressure drop at an air-flow velocity of 2.5 cm/sec. takes a practical value of 20 mm $H_2O$. If the dust collecting efficiency is raised, the pressure drop greatly increases up to an impractical value. Accordingly, a filter medium having a dust collecting efficiency as high as 99.9999% or more with respect to $0.12\mu$ diameter particles as required in the aforementioned LSI industry, and so on has not yet been realized not only in Japan but also in foreign countries.

With reference to the accompanying drawings, the invention will hereinafter be described in detail.

Figure 2:
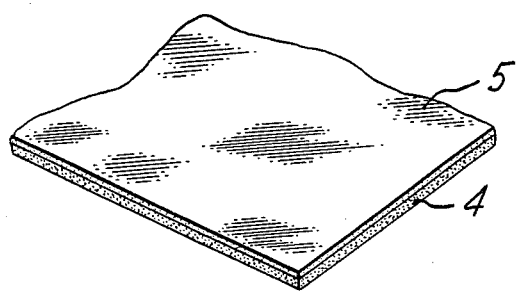
FIG. 2 is a fragmentary perspective view illustrating an embodiment of the present invention.

FIG. 2 is a partial perspective view illustrating an embodiment of the present invention, which is characterized in that a dust-collecting, glass fiber layer 5 of such a thickness as to provide a desired pressure drop is formed, by paper-making methods with glass fibers of such a diameter as to achieve a desired dust collecting efficiency, on a fiber layer 4 of a low pressure drop which is not intended for dust collection (which layer will hereinafter be referred to as a supporting fiber layer). In accordance with the present invention, based on a novel structure in that the supporting fiber layer 4 makes up for the insufficient mechanical strength of the dust-collecting, glass fiber layer 5, the thin glass fiber layer 5 of small-diameter glass fibers, that is, a dust collecting layer having an extremely high dust collecting efficiency and a low pressure drop is provided, by which it is possible to realize an epoch-making, high-efficiency filter medium which had not been obtained in the past.

The amount of glass fibers used for the dust-collecting fiber layer 5 in this invention is much less than that for the supporting fiber layer 4 and, in addition, the supporting layer 4 is not intended for dust collection and is sufficient if its pressure drop is low. Therefore, by forming the supporting fiber layer of, for example, large-diameter synthetic fibers (for example, polypropylene fiber, nylon fiber and so forth) and natural fibers which are more inexpensive than the glass fiber and can be incinerated, it is possible to construct a high-efficiency filter medium which is low-priced and can be reduced in bulk by incineration. Further, the supporting fiber layer 4 may be formed of only glass fibers for high temperature use and may also be formed of only synthetic fibers to provide for alkali resistance. Next, examples of the air filter medium of the present invention will be described.

EXAMPLE (1)

Polypropylene fibers of about 2 to 5 $\mu$m in diameter were heat-pressed to a thickness of 0.3 mm with a density of 80 gr/m$^2$ to form the supporting fiber layer 4 in a non-woven fabric. On the supporting fiber layer was formed, about 0.05 to 0.1 mm thick, the dust-collecting, glass fiber layer 5, by paper-making methods, with glass fibers of about 0.2 to 0.29 $\mu$m average diameters at a density of 15 to 20 gr/m$^2$. The filter medium thus otained has a dust collecting efficiency of 99.9999% or more for 0.1 to 0.12 $\mu$m diameter particles, which cannot be filtered by conventional techniques. Its pressure drop is 10 to 23 mm H$_2$O at an air-flow velocity of 2.5 cm/sec., and the pressure drop of the supporting fiber layer 4 alone is 2 to 3 mm H$_2$O. While a prior art filter medium using a mixture of glass fibers of different diameters needs glass fibers of 80 gr/m$^2$, glass fibers as much as 75% (i.e. 60 gr/m$^2$) are substituted by the synthetic fibers in accordance with this invention, so that the filter medium of this Example is low-priced and, in addition, its bulk after incineration is reduced down to about ¼ that of the conventional filter medium due to burning up of the synthetic fibers. When a 15 mm wide test piece of this filter medium was subjected to a tension test, a tensile strength of 1 kg was obtained, proving that the filter medium of this Example had a sufficient mechanical strength. Accordingly, a practical air filter medium, which might be said to be an ultra-high-efficiency one, if the conventional filter medium of the highest dust collecting efficiency is called a high-efficiency one, can be provided at a low cost, thereby greatly contributing to enhancement of the quality of products in the LSI industry.

In the above example, the dust-collecting, glass fiber layer 5 is formed by paper-making methods on the supporting fiber layer 4 but, in this case, it is also possible to mix an adhesive binder of a suitable concentration in the glass fibers so that the adhesion of the glass fiber layer to the supporting fiber layer 4 is improved to prevent the former from coming off from the latter due to the air-flow pressure. Furthermore, the dust-collecting fiber layer 5 may also be produced separately from the supporting fiber layer 4 and then adhered on the latter with an adhesive.

EXAMPLE (2)

On the supporting fiber layer 4 produced in the same manner as in Example 1 was formed a dust-collecting, glass fiber layer 5 of 0.2 to 0.29 average $\mu$m diameter glass fibers to a thickness of 0.05~0.08 mm with a density of 8 to 13 gr/cm$^2$. The filter medium thus produced had a dust collecting efficiency of 99.97% with respect to 0.3 $\mu$m diameter particles and a pressure drop of 7 to 10 mm H$_2$O at an air-flow velocity of 2.5 cm/sec. This pressure drop value is less than ½ the pressure drop of 20 mm H$_2$O (air-flow velocity of 2.5 cm/sec.) of a filter medium produced by a conventional method using a mixture of glass fibers of various diameters and having a dust collecting efficiency of 99.97%; namely, such a low pressure drop has not been obtainable in the past. This can be said to be a high-efficiency which is realized by the novel construction of the present invention that the dust-collecting, glass fiber layer 5 is formed thin using glass fibers capable of being of reduced diameter as compared with synthetic and natural fibers, while retaining the mechanical strength of the filter by the supporting fiber layer 4.

EXAMPLE (3)

The supporting fiber layer 4 of nylon fibers of 10 to 20 $\mu$m diameter was formed 0.5 mm thick by paper-making methods with a density of 50 gr/m$^2$. On the supporting fiber layer thus obtained was formed the dust-collecting fiber layer 5 of 0.3~0.33 $\mu$m average diameter glass fibers by paper-making methods with a density of 3~5 gr/m$^2$. As a result of this, there could be obtained a so-called medial efficiency filter medium which had a dust collecting efficiency of 60 to 75% with respect to 0.3 $\mu$m diameter particles and a pressure drop of 2~3 mm H$_2$O at an air-flow velocity of 2.5 cm/sec. The pressure drop of this filter medium is as low as about ½ that of the conventional filter medium and the amount of glass fibers used is about 10% and the amount of synthetic fibers 90%. Accordingly, a medial efficiency filter medium which is highly excellent in terms of pressure drop can be produced at substantially the same cost as in the past. The present invention can be said to greatly contribute not only to the realization of an ultra-high-efficiency filter medium but also to the enhancement of the performance of a high- and medial-efficiency filter medium.

As will be appreciated from the foregoing, it is possible to realize not only a practical ultra-high-efficiency filter medium of low pressure drop unobtainable in the past but also an excellent high- and medial-efficiency filter medium in accordance with the present invention and, in addition, the filter medium can be made low-priced and the bulk thereof, upon disposal, can be substantially reduced by incineration. Accordingly, the present invention markedly contributes to the LSI, atomic and other industries.

What I claim is:

1. An air filter medium comprising:
   a supporting fiber layer made of polypropylene fibers and of low dust-collecting efficiency for particles having a diameter less than 0.3 μm and low pressure drop; and
   a dust-collecting layer of glass fibers of a diameter necessary for obtaining a desired dust-collecting efficiency formed on said supporting fiber layer to a thickness less than one third the thickness of said supporting fiber layer and sufficiently thick to obtain a dust-collecting efficiency of 99.9999% for 0.1 to 0.12 μm diameter particles and a pressure drop of 10 mm to 23 mm of water at an air flow velocity of 2.5 cm/sec, and said air filter medium having a total thickness less than 0.4 mm.

2. An air filter medium according to claim 1, in which said supporting fiber layer is formed by large-diameter polypropylene fibers.

3. An air filter medium according to claim 1, in which the supporting fiber layer is comprised of polypropylene fibers of about 2 to 5 microns in diameter, and in which the dust-collecting layer is comprised of glass fibers of an average diameter of about 0.2 to 0.29 microns formed by paper-making on said supporting fiber layer.

* * * * *